(No Model.)
J. J. MOORE.
STRAW STACKER.
No. 284,317. Patented Sept. 4, 1883.
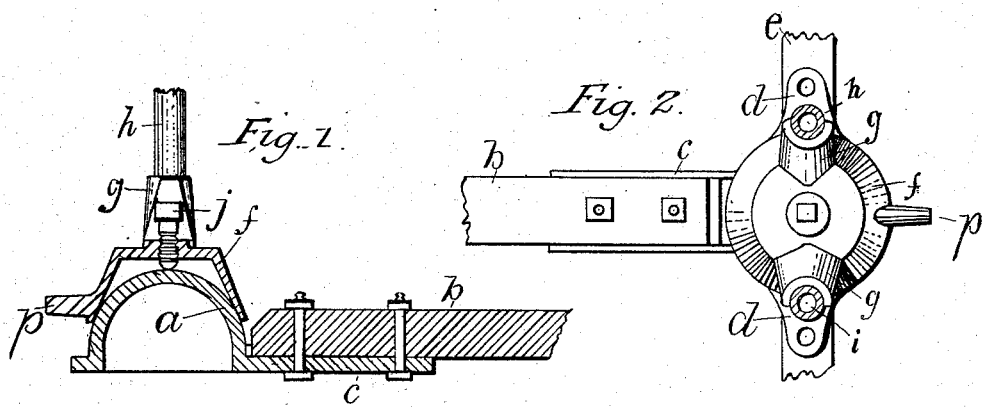
WITNESSES:
E. E. Sickler
Frank A. Jacob
INVENTOR:
Jonathan J. Moore
By H. P. Hood
Atty.

UNITED STATES PATENT OFFICE.

JONATHAN J. MOORE, OF THORNTOWN, INDIANA, ASSIGNOR OF ONE-HALF TO JAMES A. BALL, OF SAME PLACE.

STRAW-STACKER.

SPECIFICATION forming part of Letters Patent No. 284,317, dated September 4, 1883.

Application filed December 7, 1882. (No model.)

*To all whom it may concern:*

Be it known that I, JONATHAN J. MOORE, a resident of Thorntown, in the county of Boone and State of Indiana, have invented certain new and useful Improvements in Straw-Stackers, of which the following is a specification, having reference to the accompanying drawings.

My invention relates to certain improvements in a straw-stacker for which I was granted Letters Patent No. 262,814, dated August 15, 1882.

The object of my invention is, first, to provide a pivot and step for the lower end of the derrick which shall be adjustable, so that the derrick will turn more or less easily, as may be desired.

The accompanying drawings illustrate my invention, in which—

Figure 1 represents a vertical section, and Fig. 2 a plan of my improvement in the lower pivot.

The same letters refer to the same parts in both figures.

$a$ is an inverted cup-shaped casting having curved sides, and secured to the tongue $b$ by bolts passing through an arm, $c$. Lugs $d$ are also formed thereon for the purpose of receiving bolts to secure thereto a cross-bar, $e$, to give a broader bearing on the ground to the base of $a$.

$f$ is a conical socket having straight sides adapted to fit over and rest upon the curved sides of $a$.

$g\ g$ are upwardly-projecting lugs, cast integral with or secured to casting $f$, and adapted to receive the lower ends of the tubes $h\ i$, which form the derrick, as fully explained in my before-mentioned patent.

A set-screw, $j$, is screwed into the center of $f$, its lower end resting upon the top of $a$. The object of screw $j$ is to adjust the contact of $f$ upon $a$ and thereby allow the derrick with its straw-carrier to turn more or less freely thereon. The object in making the sides of $a$ curved and those of $f$ straight is to prevent their becoming wedged tightly together, and also to obviate the necessity of placing $a$ on ground exactly level.

I claim as my invention—

1. The pivot-casting $a$, having curved sides and conical socket $f$, having straight sides, combined with tubes $h$ and $i$, forming the lower end of a derrick, as shown and described, for the purpose set forth.

2. The combination, with pivot-casting $a$, and socket $f$, of set-screw $j$, for the purpose set forth.

JONATHAN J. MOORE.

Witnesses:
JAS. A. BALL,
H. P. HOOD.